United States Patent [19]

Lagabe et al.

[11] 4,157,235
[45] Jun. 5, 1979

[54] DEVICE FOR MODIFYING THE THICKNESS OF A BODY EXTRUDED AT A CONSTANT RATE

[75] Inventors: André E. R. Lagabe, Toul; Bernard A. Prevotat, Foug, both of France

[73] Assignee: Pont-a-Mousson S.A., Nancy, France

[21] Appl. No.: 817,648

[22] Filed: Jul. 21, 1977

[30] Foreign Application Priority Data

Jul. 30, 1976 [FR] France .............................. 76 23457
Jun. 10, 1977 [FR] France .............................. 77 17902

[51] Int. Cl.$^2$ ............................................ B29D 23/04
[52] U.S. Cl. .................................... 425/71; 264/167; 264/209; 425/325; 425/377; 425/380; 425/392
[58] Field of Search ............... 425/392, 393, 325, 327, 425/376 R, 380, 467, 381, 71, 371, 372, 385; 264/167, 177 R, 209, 210 R, 296

[56] References Cited

U.S. PATENT DOCUMENTS 3,456,296 7/1969 Schneider .......................... 425/327
3,966,379 6/1976 O'Brien .............................. 425/327

FOREIGN PATENT DOCUMENTS 2285979 4/1976 France ................................... 425/327

Primary Examiner—Roy Lake
Assistant Examiner—Mark Rosenbaum
Attorney, Agent, or Firm—Sughrue, Rothwell, Mion, Zinn and Macpeak

[57] ABSTRACT

The process modifies the thickness of the wall of a tube of thermoplastic material which issues at constant speed from an extruder and is driven downstream of and in the extension of the extruder by a drawing machine. The drawing machine has motorized rolling members which frictionally drive the tube and permit modifying the speed at which the tube is driven. The thickness of the wall is modified by producing a relative movement of translation between the extruder and drawing machine while maintaining the speed of rotation of the rolling members.

12 Claims, 13 Drawing Figures

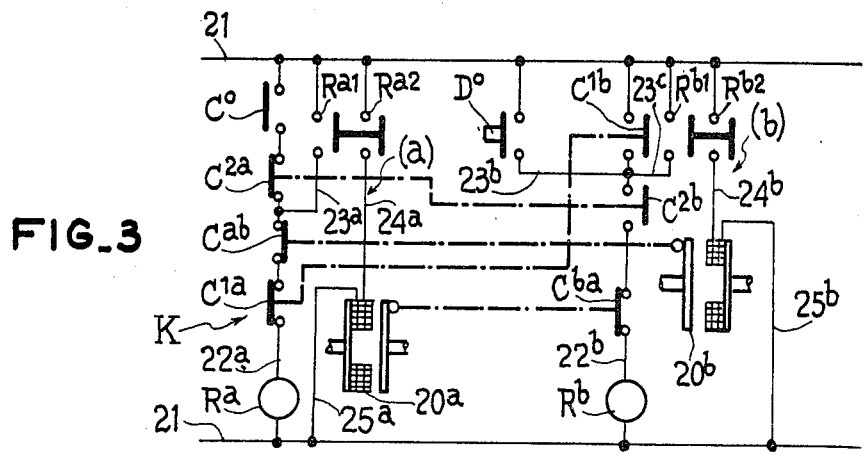
FIG_3
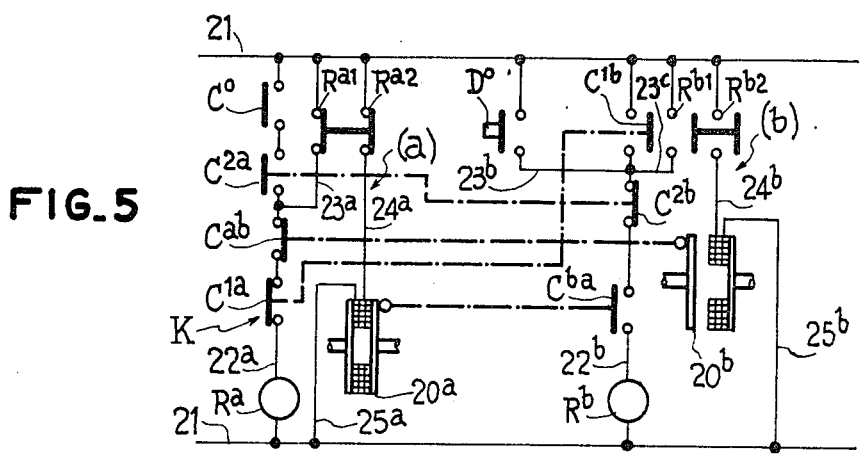
FIG_5
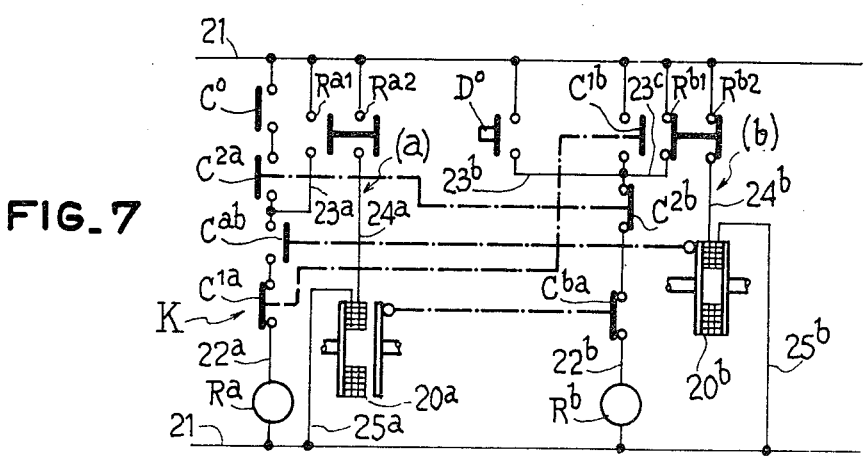
FIG_7

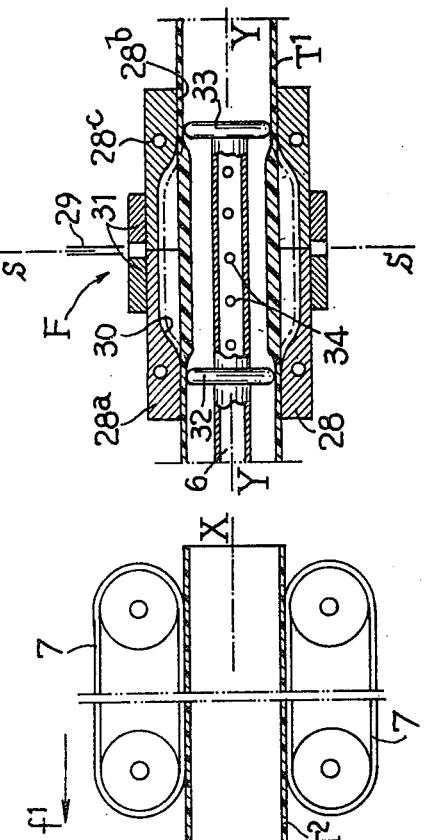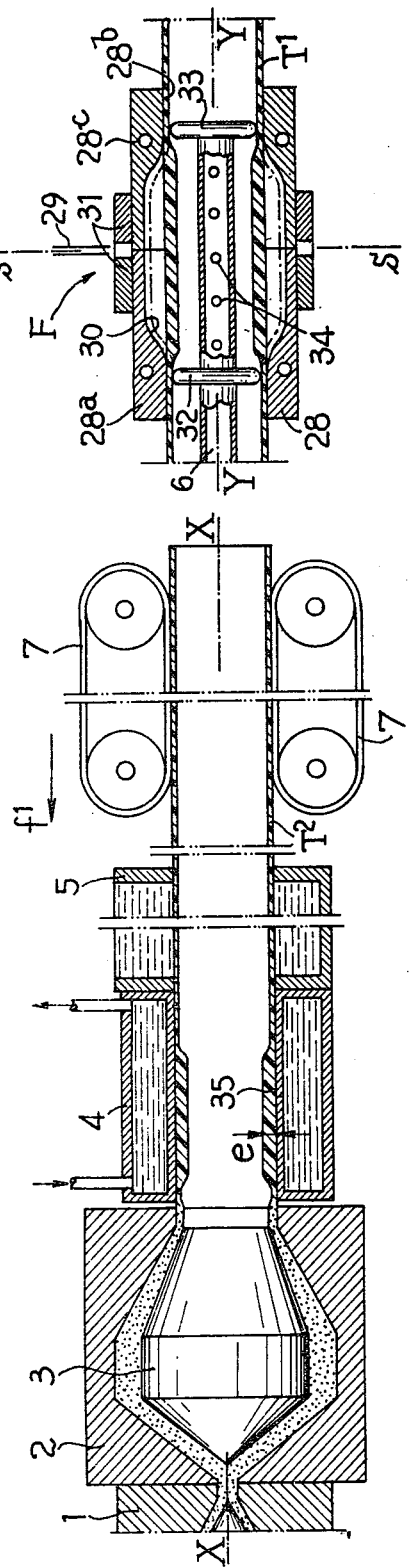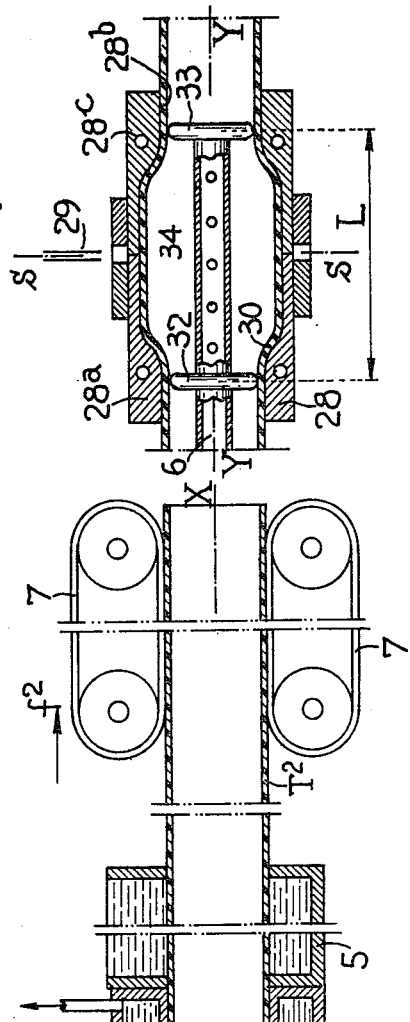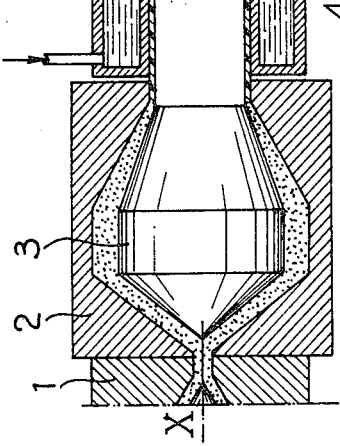

DEVICE FOR MODIFYING THE THICKNESS OF A BODY EXTRUDED AT A CONSTANT RATE

The present invention relates to a process and device for modifying the thickness of a body and, in particular, a tube of thermoplastic material issuing from an extruder at a constant rate and driven by friction downstream of and in the extension of the extruder by a drawing machine comprising a plurality of motorized means which roll on the body and are arranged around a section of the body. It more particularly applies to the extrusion of tubes or pipes of thermoplastic material intended to be subsequently provided with a coupling socket at one end.

It is known that to produce such sockets, one end of the extruded tubes, which are cut into sections, can be subjected to a heating followed by a radial expansion, but that, in order to avoid a thinning down of the wall in the expanded region, a thickening of the tube in this region must be previously provided. This requirement exists moreover whenever an extruded body must be subsequently partially deformed.

It has already been proposed, in particular in the U.S. Pat. No. 2,512,844 and the French Pat. No. 1,252,029, for the purpose of varying to the desired extent the thickness of a body extruded at a constant rate, to modify the speed of the driving of the body and the motorized means of the drawing machine. When this speed is increased, the extruded body is stretched and becomes thinner and when the speed is decreased, there is produced a phenomenon of an accumulation or urging back of the extruded material which thickens this body.

In these two patents, this modification is achieved by varying the speed of rotation of the rolling means. This procedure is unsatisfactory. Indeed, these means always present problems as to the evenness of the adherence to the surface of the extruded body and these problems increase when the speed of rotation is varied to such an extent as to render impossible a precise control of the variation in the thickness of the extruded body and of the length in which this variation takes place.

An object of the invention is to provide a process of the same type but wherein it is possible to limit to the maximum the incidence that the aforementioned unevenness in the adherence has on the quality of the product obtained.

According to the invention, there is provided a process of the type in which the driving speed of the extruded body is modified by motorized rolling means, wherein, while maintaining the speed of rotation of said rolling means constant, there is produced a relative movement of translation between the drawing machine and the extruder. Thus, the rolling of said rolling means on the tube occurs at constant speed downstream of the extruder and the variation in the speed of output of the tube is as it were transferred upstream of the cooling tank, that is to say where the material of the tube is still soft.

Advantageously, in order to achieve a periodic thickening of the body, in particular when it is desired to produce a periodic thickening of an extruded tube of thermoplastic material for the purpose of a subsequent radial expansion of the thickened parts of said tube, there is produced alternately a relative movement of the drawing machine and extruder in a direction toward and away from each other, said movement toward each other being achieved at a relatively high speed and said movement away from each other at a relatively low speed.

In one manner of carrying out the invention, the drawing machine is fixed in translation and the extruder is displaced relative to the drawing machine and the speed at which the extruder is driven is permanently controlled by the speed of rotation of the rolling means.

Another object of the invention is to provide an installation for carrying out said process. This installation comprises an extruder having a constant output and a drawing machine located downstream, and in the extension, of the extruder and comprising a plurality of rotatable motorized rolling means frictionnally engaging said body and arranged around a section of said body, wherein the extruder or the drawing machine is carried by a frame which is mounted to be reciprocatable in a direction perpendicular to the axes of rotation of the rolling means and means are provided for driving the rolling means at constant speed and the frame in said direction.

Further features and advantages of the invention will be apparent from the ensuing description with reference to the accompanying drawings which are given solely by way of example and in which:

FIG. 3 is a diagrammatic view of the electric control of the drawing machine of FIG. 1;

FIG. 4 is a partial view, corresponding to FIG. 1 but more diagrammatic and to an enlarged scale, of the installation in the course of the forming of a thickened portion by displacement of the drawing machine toward the extruder;

FIG. 5 shows the state of the control of FIG. 3 in the course of this stage of operation;

FIG. 6 is a view, similar to FIG. 4, of the installation in the course of the production of a tube section devoid of a thickened portion by moving the drawing machine away from the extruder;

FIG. 7 shows the state of the control of FIG. 3 in the course of this stage of operation;

FIG. 8 is a diagrammatic view, corresponding to FIG. 2 but to the same scale as FIG. 4, of the radial expanding device before expansion of a tube portion;

FIG. 9 is a view, similar to FIG. 8, of the radial expansion device after the expansion of the tube portion;

Figure 2:
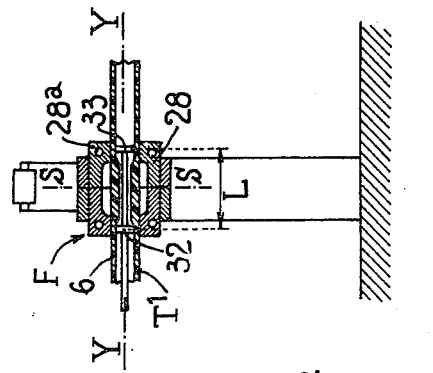
FIG. 2 is a diagrammatic view of a device for radially expanding the tube portions thicknened by the process according to the invention.

The extruding installation shown in FIGS. 1 to 9 is provided to continuously produce tubes of plastics material which have, at one end of the body thereof, a socket for interconnecting the tubes. Such tubes are produced in two stages on two different production lines, one of which has an axis X—X and the other an axis Y—Y, namely:

a stage for producing tube sections $T^1$ having a wall thickened in a certain length thereof (axis X—X), this stage being illustrated in FIGS. 1 and 3 to 7;

a stage for radially expanding the thickened parts (axis Y—Y) of the tubes $T^1$ illustrated in FIGS. 2, 8 and 9.

Figure 1:
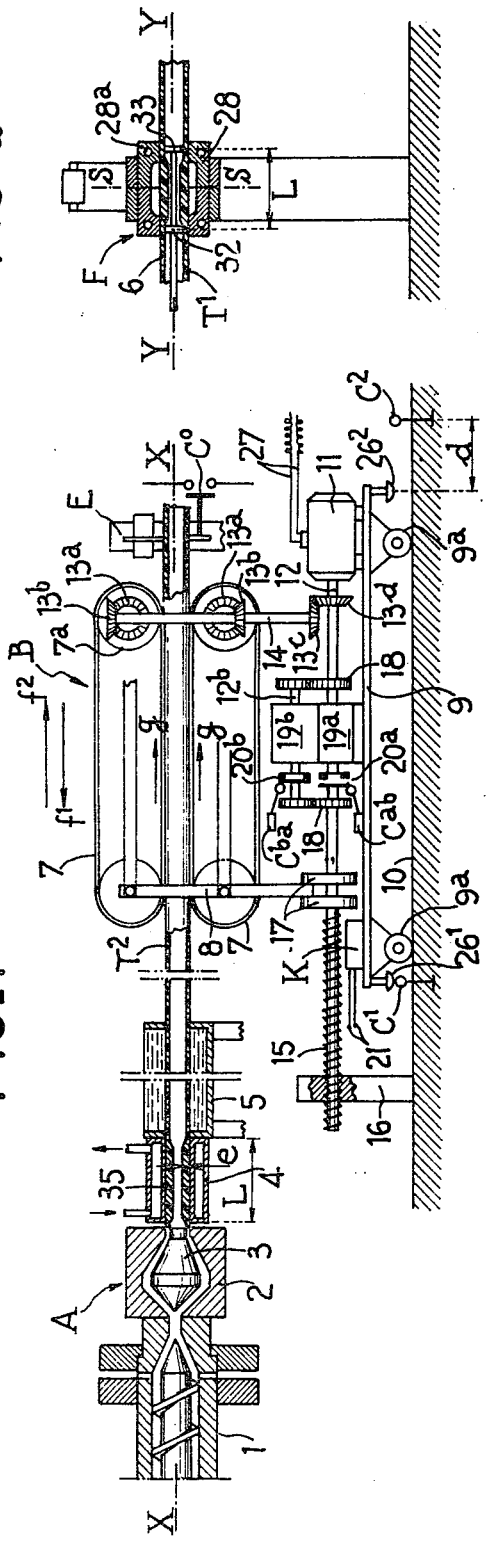
FIG. 1 is a diagrammatic assembly view, partly in longitudinal section and with parts cut away, of an extruding installation comprising an extruder and a drawing machine according to the invention.

The first stage is carried out by means of the installation the assembly of which is shown in FIG. 1. This installation comprises an extruder A and a drawing machine B.

The extruder A is a conventional screw-type extruder for extruding thermoplastic material, such as for example rigid polyvinyl chloride, constituting the tubes $T^1$. The extruder A comprises, in succession, a constant-output screw head 1, an upstream hot die head 2 having a tube-expanding torpedo 3, a cold calibrating die head 4, or downstream die, having a circulation of cold water under pressure, and a tank 5 for circulating cold water.

The drawing machine B comprises a set of endless tracks 7 for driving the continuous extruded tube $T^2$ which are evenly spaced apart around the axis X—X. The inner reaches of these tracks are all parallel to the axis X—X and arranged in such manner as to be all in contact with the tube. The tracks 7 are two in number in the illustrated embodiment, but it will be understood that three, four or more tracks may be provided. These tracks are driven in synchronism and at constant speed in the direction of arrow g, that is to say in the direction of the extrusion. The linear speed of the tracks 7 corresponds to their theoretically slip-free rolling on the tube $T^2$ under conditions which will be defined hereinafter.

The tracks 7 are carried by a frame 8 which is secured to a carriage 9 which is movable, owing to the provision of wheels $9^a$, on a rectilinear runway 10 parallel to the axis X—X.

The mechanism for driving the tracks 7 and the carriage 9 will now be described.

The carriage 9 is provided with the following means which is, on one hand, capable of driving it in translation in both directions $f^1$, $f^2$ at two different speeds, with reversal of the directions at the ends of the travel and control of times of displacement in each direction, and, on the other hand, capable of driving the tracks 7 simultaneously at constant speed always in the same direction g.

An electric motor 11 secured to the carriage 9 and rotating at constant speed always in the same direction drives through the output shaft 12 of the motor and through two different transmissions, on one hand, the tracks 7 and, on the other hand, the carriage 9.

The tracks 7 are shifted by a pair of direction changing wheels $7^a$ located on each side of the tube $T^2$ to be driven. Each driving wheel receives motion from a set of bevel gears $13^a$, $13^b$. The two gears $13^b$ are keyed on a common shaft 14 driven by the drive shaft 12 through another set of bevel gears $13^c$, $13^d$.

The tracks 7 are thus driven at a constant speed, depending on the speed of the drive shaft 12 and on the transmission ratio given by the set of bevel gears $13^a$ to $13^d$ connecting the drive shaft 12 to the driven shaft 14 and, thence, to the wheels $7^a$. This ratio may be for example equal to one.

The carriage 9 is driven by a mechanism having a lead-screw 15 and a nut 16. The rotary lead-screw 15 is connected to move in translation with the carriage 9 by flanges 17 provided thereon and bearing against the frame 8. The lead-screw 15 cooperates with the nut 16 which is secured to the ground.

A transmission is interposed between the drive shaft 12 and the lead-screw 15. This transmission is effective through two paths having different transmission ratios and in two directions:

a path (a) for rapid reverse travel, the elements of which carry the index a, for the displacement (reverse travel) of the drawing machine B in the direction of arrow $f^1$, that is to say for moving it toward the extruder A;

a path (b) for slow movement, the elements of which carry the index b, for displacing forward travel the drawing machine B in the direction of arrow $f^2$, that is to say in the direction in which the extruded tube $T^2$ issues from the extruder or in the direction in which the drawing machine is moved away from the extruder A.

The two paths are connected in parallel, the slow path (b) constituting a branch of the rapid path (a).

In the rapid path, there is provided a speed reducer $19^a$ driven by the shaft 12 whose output is integral with the driving plate of a clutch $20^a$, for example a disc clutch, controlled by an electromagnet and having a driven plate which is connected to rotate with the lead-screw 15. When the clutch $20^a$ is engaged, the lead-screw 15 rotates relatively rapidly in the direction corresponding to the reverse travel of the carriage 9 (direction $f^1$).

In respect of the slow path, there is provided a motion take-off from the drive shaft 12 through a pair of gears 18 having parallel axes of rotation, one being keyed on the shaft 12 and the other on a secondary drive shaft $12^b$ of a speed reducer-reverser unit $19^b$ having a transmission ratio lower than that given by the speed reducer $19^a$. The output shaft of the unit $19^b$ is integral with the driving plate of a clutch $20^b$ whose driven plate is capable of transmitting its motion to a second pair of gears 18 having parallel axes of rotation, one of which is keyed on the shaft of the driven plate of the clutch $20^b$ and the other on the lead-screw 15. When the clutch $20^b$ is engaged, the lead-screw 15 rotates relatively slowly in the direction corresponding to the forward travel of the carriage 9 (direction $f^2$).

An electric control K carried, for example, by the carriage 9 and described hereinafter, permits, by controlling the clutches $20^a$ and $20^b$, transmitting the motion from the motor 11 to the lead-screw 15 through the rapid reverse path, or through the slow advance path, it preventing the passage through the two paths at the same time but permitting that the two paths be at the same time inactive or declutched. The control K is actuated:

by a contact C° which is fixed relative to the ground and actuated by the tube $T^2$ when the latter reaches a predetermined length;

by contacts $C^{1a}$–$C^{1b}$ and $C^{2a}$–$C^{2b}$ carried by fixed abutments $C^1$ and $C^2$ of ends of travel of the carriage 9;

by contacts $C^{ab}$ and $C^{ba}$ actuated by the clutches $20^b$ and $20^a$ respectively.

The electric circuit of the control K is the following (FIG. 3):

Connected in parallel between two electric current supply wires 21 are two electric circuits, namely a circuit (a) for the rapid reverse path and the clutch $20^a$, and the other, circuit (b) for the slow advance path and the clutch $20^b$.

(a) Rapid reverse path (clutch $20^a$ - direction $f^1$)

Connected in series to a wire $22^a$ between the wires 21 are the following:

the contact $C°$ which acts as a general switch;

the contact $C^{2a}$ directly mounted on the end-of-travel limiter $C^2$ of the carriage 9 of the drawing machine in the direction of arrow $f^2$; this contact $C^{2a}$ closes in the corresponding end-of-travel position of the carriage;

a relay coil $R^a$ having self-supply contacts $R^{a1}$ and $R^{a2}$ for supply current to the electromagnet (not shown) of the clutch $20^a$;

a contact $C^{ab}$ actuated by the driven plate of the clutch $20^b$ so as to close when this plate moves away and to open when this plate is applied against the associated driving plate;

the safety contact $C^{1a}$ pertaining to an end-of-travel limiter $C^1$ of the carriage 9 of the drawing machinr in the direction of arrow $f^1$.

Connected to the wire $22^a$ in parallel with the contacts $C°$ and $C^{2a}$ is a self-supply wire $23^a$ of the coil $R^a$. The contact $R^{a1}$ is connected in series with the wire $23^a$.

The electromagnet for moving the plates of the clutch $20^a$ toward and away from each other is supplied with current through a wire $24^a$ connected in parallel between the wires 21. Connected in series with the wire $24^a$ is the supply contact $R^{a2}$ which is coupled with the contact $R^{a1}$ and closes and opens at the same time as the latter. A wire $25^a$ completes the circuit of this electromagnet.

(b) Slow advance path (clutch $20^b$–direction $f^2$)

The electric circuit is essentially similar to that of the rapid path. Similar elements carry the same reference numerals to which the index b has been added.

Connected to the wire $22^b$ there are consequently:

the contact $C^{1b}$, pertaining in the same way as the contact $C^{1a}$, to the end-of-travel limiter $C^1$ to which it is directly connected. This contact $C^{1b}$, which closes in this end-of-travel position of the carriage, is coupled or combined with the contact $C^{1a}$ of the wire $22^a$ so as to be opened when the latter is closed and vice-versa;

a relay coil $R^b$ having a self-supply contact $R^{b1}$ and a contact $R^{b2}$ for supplying current to the electromagnet (not shown) of the clutch $20^b$; the contacts $R^{b1}$ and $R^{b2}$ are coupled in such manner as to open and close simultaneously;

the contact $C^{ba}$ actuated when the plates of the clutch $20^a$ move away and toward each other (it closes when the plates move away from each other and opens when they are applied against each other);

the safety contact $C^{2b}$ pertaining, as the contact $C^{2a}$, to the end-of-travel limiter $C^2$. The contact $C^{2b}$ is coupled with the contact $C^{2a}$ so as to open when the latter is closed and vice-versa.

Connected to the wire $22^b$, in parallel with the contact $C^{1b}$ are, on one hand, a wire $23^b$ in which there is inserted a push-button switch $D°$ for a semi-automatic control of the displacement of the carriage 9 and, on the other hand, a wire $23^c$ provided with a contact $R^{b1}$.

The circuit of the electromagnet of the clutch $20^b$ comprises a wire $24^b$ including the contact $R^{b2}$ and a wire $25^b$.

As can be seen, the contact $C^{2b}$ of the limiter $C^2$ and the contact $C^{1a}$ of the limiter $C^1$ respectively act on the wire $22^b$ and on the wire $22^a$ in the manner of safety contacts so that the path or channel in which each thereof is connected is not supplied with current at the same time as the other path or channel. Consequently, when the slow path is supplied with current, the rapid path is not supplied and vice-versa.

The end-of-travel limiters $C^1$ and $C^2$ are respectively actuated by a projection or ramp $26^1$ placed at the end of the carriage 9 which is the nearest to the extruder A and by a projection or ramp $26^2$ which is placed at the end of the carriage 9 the most remote from this extruder.

It can be seen that the control K comprises the following couplings:

coupling of the contacts $R^{a1}$-$R^{a2}$, on one hand, $R^{b1}$-$R^{b2}$, on the other;

coupling of the contacts $C^{1a}$-$C^{1b}$, on one hand, and $C^{2a}$-$C^{2b}$, on the other (shown in dot-dash line in FIG. 3);

"crossed" coupling (also shown in dot-dash line in FIG. 3), on one hand, between the contacts $C^{ab}$ of the rapid path circuit and the clutch $20^b$ of the slow path circuit and, on the other hand, between the contact $C^{ba}$ of the slow path circuit and the clutch $20^a$ of the rapid path circuit.

Note that the motor 11 is itself supplied with current by wires 27 independent of the circuit described hereinbefore.

Note that it is only for reasons of clarity that the contacts $C°$, $C^{ab}$ and $C^{ba}$ have been shown twice in the drawings, namely in FIG. 1 in their precise geographical position, and in FIG. 3 in the electric control. Of course, there is only a single contact $C°$, a single contact $C^{ab}$ and a single contact $C^{ba}$.

A conventional sectioning or severing device E carried by the end of the carriage 9 opposed to the extruder A, severs predetermined sections of tube $T^2$, for example lengths $T^1$ equal to two lengths of finished pipe. This sectioning is carried out at the output of the drawing machine B in the region of the contact $C°$.

In order to complete the description of the installation, there will be briefly described with reference to FIGS. 2, 8 and 9, the station F for expanding the sockets of the tubes $T^1$ which is located in another production line having an axis Y—Y which may be either in the extension of the axis X—X or parallel to the axis X—X.

At station F there is provided a mould and means for blowing a compressed fluid. The metal mould is in two parts 28, $28^a$ separated by a horizontal diametral joint plane contained in the axis Y—Y and is also cut in a median transverse plane S—S which embodies the future separation of the two juxtaposed sockets and allows the passage for a sectioning cutter 29. The cavity of the mould 30 has an inner profile defining the shape of two bells or sockets which are axially juxtaposed at their flared ends. At the axial ends of the mould, the latter has necks $28^b$ having a diameter corresponding to the outside diameter of the tube $T^2$ as it issues from the hot die head 2. The mould 28, $28^a$ is clamped in a vice having cylindrical jaws 31 which also allows a passage for the cutter 29. This mould 28, $28^a$ is provided with heating means (for example heating fluid conduits $28^c$ or, by way of modification, an electric resistance not shown) capable of raising the temperature of the double tube to be expanded to a value of the order of 160° to 180° C. in respect of rigid polyvinylchloride.

The blowing means is an axial conduit 6 of compressed air which comprises two flexible and elastic closure members 32 and 33 whose outside diameter roughly corresponds to the inside diameter of the tube $T^1$. Their flexibility is adapted to permit an elastic, sealed and forceful engagement thereof against the inner wall of the tube $T^1$ in the region of the necks $28^b$ after having allowed through the median inner thickened portion of the tube $T^1$.

Between the closure members 32 and 33 which are spaced apart a distance L, the conduit 6 communicates by way of blowing orifices 34 with the expansion chamber defined by the portion of the tube $T^1$ and the closure members 32 and 33.

The installation just described operates in the following manner.

The extruder A is made to operate at constant speed, that is to say, it produces a constant flow of plastics material. Consequently, there issues from the hot die head 2, at constant speed, a tube $T^2$ at a temperature of the order of 160° C. It is plastic and malleable until it enters the cold die head 4. It is in the latter that the inner thickening e will be formed in a length L of the tube corresponding to that situated between the closure members 32 and 33 of the mould 28, $28^a$, and consequently equal to that of the two successive sockets. The length L is roughly equal to that of the cold die head 4.

This inner thickening or this sleeve 35 having an inner thickening e is formed in the following manner:

Starting at the position of the drawing machine B the most remote from the extruder 1, the tracks 7 are driven at constant speed, and, at the same time, the constant speed drawing machine is moved toward the extruder by driving the carriage 9 in the direction of arrow $f^1$. Thus, the speed of travel of the carriage 9 is subtracted from the speed of the tracks so that the tube $T^2$ is retarded as it issues from the extruder while it is continued to be extruded at a given speed. The result of this is that the extruded plastics material which is externally calibrated by the cold die head 4 is made to accumulate inside the tube and thus produce a thickening of the latter.

In moving rearwardly, the drawing machine B therefore produces a compression or an axial urging back of the tube $T^2$ during the whole of its rearward travel (FIG. 4). More precisely, if the percentage of increase in section to be obtained for a thickening e is y% and if v is the normal speed for extruding and drawing the tube $T^2$ without forming a thickening, the rearward travel speed of the drawing machine B to be produced by the motor 11 the reducer $19^a$ and the clutch $20^a$ is: $v \times y\%$. The sleeve 35 having a thickness e is thus formed inside the cold die head 4.

At the end of a predetermined period of time corresponding to the length of the sleeve 35 equal to L, that is to say in practice when the carriage 9 has moved rearwardly a distance d, the direction of movement of the drawing machine B is reversed so as to drive it once more at a slower speed in the direction of arrow $f^2$ which is the direction for extruding. As the speed of displacement of the drawing machine is then added to the speed of displacement of the tracks 7, the tube $T^2$ is no longer retarded but, on the contrary, tends to be slightly stretched and thinned in as much as the resulting speed exceeds the extruding speed (FIG. 6). But this tendency to thin the tube is small owing to the low speed of travel of the carriage 9. Moreover, the speed of travel of the carriage 9 causes it to travel through a distance d within a time corresponding to a travel of a length of tube $T^2$ equal to that of the body of a final tube. Then the cycle recommences.

A tube $T^2$ comprising at regular intervals a sleeve 35 thus travels in front of the sectioning device E which sections this tube into sections $T^1$ having two identical body portions interconnected by a sleeve 35. The sections $T^1$ are thereaftr conveyed to the expanding station F so as to be converted into two finished tubes having a socket.

The details of this operation will now be described. There will be described in succession hereinafter the actuation of the rapid path or channel (a) and the slow path or channel (b), that is to say, the actuation of the clutch $20^a$ and the clutch $20^b$ in turn.

When starting up the installation, that is to say, at the start of the extrusion, it will be assumed that the carriage 9 whose total rearward travel is equal to the distance d corresponding to the duration of extrusion of the length L of the two successive sockets to be formed (d<L), is at the end-of-travel the most remote from the extruder and that the end of the extruded tube $T^2$ will reach the contact C°, the body portion of the tube $T^2$ having being formed and the sleeve 35 having a thickening e being now on the point of being formed.

When starting up the installation under these conditions, the contact $C^{2a}$ is closed by the ramp $26^2$ and the contact $C^{ab}$ is closed by the declutched clutch $20^b$ and the contact $C^{1a}$ is closed since its homologous contact $C^{1b}$ is open. The circuit (a) is opened by the contact C°. Thus, the situation is as shown in FIG. 3 where it is clear that the circuit (b) is also open owing to the various couplings.

If the carriage 9 was at a distance intermediate between the ends-of-travel, it would be brought to the end-of-travel contact $C^2$, for example, by means of a handwheel keyed on the lead-screw 15 (not shown) or by depressing the push-button D° which causes the current to pass through the wires $22^b$ and $23^b$. Starting from the end-of-travel switch $C^2$ is indeed obligatory in the case of an electric control as described hereinbefore.

When the tube $T^2$ reaches the contact C°, it closes it and at the same time closes the circuit (a).

Consequently, the wire $22^a$ is supplied with current. The coil $R^a$ carries a currant and its contacts $R^{a1}$ and $R^{a2}$ are closed. One contact $R^{a1}$ self-supplies current to the coil $R^a$ of the relay so as to maintain the contacts $R^{a1}$ and $R^{a2}$ closed, whereas contact $C^{2a}$ is opened as soon as the carriage moves rearwardly in the direction of arrow $f^1$. The other contact $R^{a2}$ supplies current to the electromagnet of the clutch $20^a$. The discs of the latter are urged against each other. The contact $C^{ba}$ opens, but the coil $R^a$ remains supplied with current since the contacts $C^{1a}$, $C^{ab}$ and $C^{a1}$ remain closed. Consequently, the motion passes from the motor 11 to the lead-screw 15 through the rapid path (a). The carriage 9 moves rearwardly (direction of arrow $f^1$, FIG. 4) and the control K is in the state shown in FIG. 5. When the carriage 9 has travelled through the distance d corresponding to the length L for the sleeve 35, the projection or ramp $26^1$ depresses the end-of-travel switch $C^1$. The contact $C^{1b}$ of the wire $22^b$ closes and this causes the opening of its twin safety contact $C^{1a}$ in the wire $22^a$. The opening of this contact $C^{1a}$ cuts out the supply to the coil $R^a$. The contacts $R^{a1}$ and $R^{a2}$ open and the plates of the clutch $20^a$ separate. The contact $C^{ba}$ once again closes. The rapid path becomes stationary. The carriage 10 stops at the end-of-travel toward the extruder since the two clutches $20^a$ and $20^b$ are open (FIG. 1).

Henceforth, the thickening e is no longer produced. The tube $T^2$ rapidly resumes its normal thickness by a brief transition resulting in a rather abrupt connecting curve.

On the other hand, in the slow path circuit (b), the contact $C^{1b}$ has just closed. The contact $C^{ba}$ is closed owing to the separation of the plates of the clutch $20^a$ and the safety contact $C^{2b}$ of the wire $22^b$ is closed since the opening of its twin contact $C^{2a}$ in the wire $22^a$. The circuit (b) is therefore closed and the relay coil $R^b$ in turn receives current. The contacts $R^{b1}$ and $R^{b2}$ close. The contact $R^{b1}$ ensures the self-supply of the coil $R^b$ from the moment when the carriage 9 will start to move in the direction of arrow $f^2$ and therefore release contact $C^1$ and open contact $C^{1b}$. The contact $R^{b2}$ permits the supply of current to the electromagnet of the clutch $20^b$. The plates of the latter are applied against each other. The contact $C^{ab}$ opens but the coil $R^b$ remains supplied with current because the contacts $C^{2b}$, $C^{ba}$ and $R^{b1}$ remain closed. The motion then passes from the motor 11 to the lead-screw 15 through the clutch $20^b$ in reversing the direction of rotation of the lead-screw through the action of the reducer-inverter $19^b$. The carriage 9 starts again in the direction of arrow $f^2$ by following the movement of the extruded tube $T^2$ (FIG. 6). During this movement the control K is in the state shown in FIG. 7.

During this slow travel, the carriage 9 permits the travel of a length of tube $T^2$ which is equal to twice that of a final body portion devoid of a thickening. In other words, the time of return of the drawing machine at slow speed is the time of extrusion of a length of tube $T^2$ equal to that of two body portions of finished tubes.

When the ramp $26^2$ of the carriage 10 reaches the end-of-travel contact $C^2$, the contact $C^{2a}$ in the wire $22^a$ closes and this causes the opening of its twin safety contact $C^{2b}$ in the wire $22^b$. The opening of this contact $C^{2b}$ cuts out the supply of current to the coil $R^b$. The contacts $R^{b1}$ and $R^{b2}$ open, the plates of the clutch $22^b$ separate, and, as the plates of the clutch $20^a$ are already separated, the lead-screw 15 is no longer driven in rotation. The carriage 9 stops.

The new rearward travel of the carriage 9 (direction of arrow $f^1$) will immediately start again under the conditions explained hereinbefore, since the contact $C^\circ$ is permanently closed by the tube $T^2$.

Note that the direction of travel of the drawing machine B is reversed rather rapidly so that the region of connection or transition between the body portion and the socket be as short as possible. Moreover, owing to the rather rapid reversal of the direction of travel of the drawing machine B, the speed at which the tube $T^2$ emerges remains invariable during each thickening stage and each stage in which there is no thickening, bearing in mind that the tube $T^2$ travels quicker when the carriage 9 moves at low speed in the direction of arrow $f^2$ than when the carriage moves at high speed in the direction of arrow $f^1$.

Thus the tube $T^2$ is provided at regular intervals with sleeves 35 having the thickening e.

The operational parameters to be supervised and regulated are therefore the following:

speed of rapid rearward travel of the drawing machine;

return time of the drawing machine;

speed of slow forward travel of the drawing machine.

The rapid rearward travel speed of the drawing machine is a function of the rate of increase in the section that it is desired to be obtained periodically and of the speed of rotation of the tracks 7 of the drawing machine. The sole parameter to be regulated to obtain this rate of increase in section of the extruded tube, that is to say, the rate of internal thickening e is the speed-reducing ratio of the reducer $19^a$.

The rearward travel time of the drawing machine B is determined as a function of the length L of the thickening e.

The low and constant forward travel speed of the drawing machine B is determined by the adjustment of the speed-reducing ratio of the reducer $19^b$, so that the carriage 9 returns to its point of departure with a minimum period of stoppage or reversal of direction before the following rearward travel.

Owing to the positioning of the contact $C^\circ$ and to the constant character of each of the two speeds of travel of the tube $T^2$ during the thickening and non-thickening stages, the length of the tube $T^2$ to be cut with the sectioning device E is defined with precision so that the regulation of the cutting to length by the sectioning device E may be controlled with precision in the known manner and is therefore not described. In this way, there is cut with precision a tube length equal to double the length of a pipe having a socket to be obtained, the sleeve 35 having the thickening e being exactly in the middle.

The double tube $T^1$ is then conveyed from the manufacturing workshop having the axis X—X to the manufacturing workshop having the axis Y—Y for the purpose of radially expanding the sleeve 35 inside the mould 28, $28^a$ by means of the blowing conduit 6 (FIGS. 8 and 9). The median portion of the double tube is thus expanded and thinned down until it is placed closely against the mould cavity 30 and conforms to the shape of the latter (FIG. 9). After cooling to a temperature below 80° C., the jaws 31 are separated, the mould parts 28, $28^a$ are separated, and the expanded portion is cut in the middle thereof by the cutter 29. In this way two pipes having a socket are obtained.

Owing to the mechanism for displacing the drawing machine B illustrated in FIG. 1, the desired axial compression effect is obtained simply and continuously with a precision which is easily controllable as concerns the length of the sleeve 35 having the thickening e and the thickening itself.

Owing to this periodic forward and rearward movement of the drawing machine B of which the speed of forward travel of the tracks 7 remains constant, there are avoided frequent modifications of speed of said tracks and consequently incorrect operation and unforseeable times of response, with resultant difficulties of control of thickness and unevenness in the thickness, and there are avoided unevenness in the length of travel of the tubes in the course of a complete thickening cycle which is followed, or not followed, by a thickening. Any unevenness in the adherence of the tracks on the tube $T^2$ is constant since the speed of travel of this tube with respect to the tracks is constant, the variation in the speed of travel of the tube having its effect transferred upstream in the region of the cold die head 4 where the plastics material is still soft.

It has also been seen that the reversal of the direction of displacement of the drawing machine B is rather rapid, bearing in mind the inertia of the parts so as to reduce to a minimum the length of transition between the body portion and the sleeve 35 having the thickening e corresponding to the socket and consequently to ensure an improved utilization of the material since this transition or connection region performs no function in the future joint of pipes having a socket.

Moreover, it is important that the time of stoppage or reversal of the direction of travel of the drawing machine B between two travels in opposite directions be very short or zero so as to avoid the formation of a thickening on the extruded tube in addition to the thickening e normally provided for the subsequent formation of a socket.

Owing to the connection mechanism between the tracks 7 and the carriage 9, the movement of the leadscrew 15 is known and maintained with precision, this movement governing the evenness of the thickening and the distance between the sleeves 35.

Figure 10:
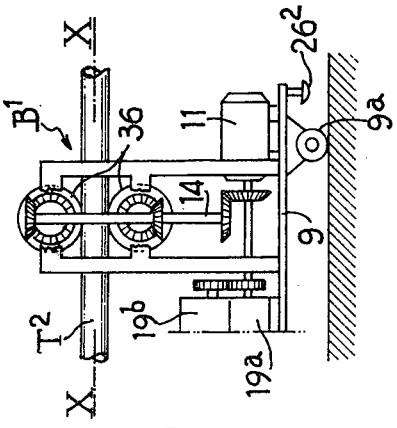
FIG. 10 is a partial diagrammatic view, to the same scale as FIG. 1, of a modification of the drawing machine of the installation according to the invention.

According to a modification of the drawing machine shown in FIG. 10, the rolling means of the drawing machine $B^1$, instead of being tracks are constituted by two driving wheels 36 which are assembled symmetrically with respect to the axis X—X of the tube $T^2$ to be driven in tangential contact with the tube. This drawing machine operates in exactly the same way as that shown in FIG. 1 and with the same advantages.

Figure 11:
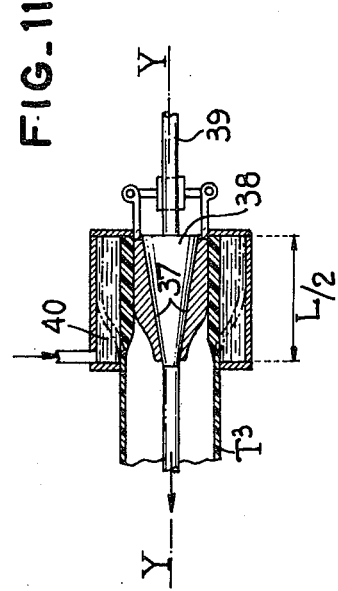
FIG. 11 is a diagrammatic sectional view, to the same scale as FIGS. 8 and 9, of a modification of the radial expanding device.

In the modification of the expanding device shown in FIG. 11, it is no longer a double socket but a single socket which is formed after the precise sectioning of the tube $T^2$ by the sectioning device E in the middle of a sleeve 25. The sectioning of pipes $T^3$ of unit length by means of the sectioning device E can be carried out with exactness owing to the two constant speeds of travel of the tube $T^2$ and to the well-defined position of the contact $C°$ of the start of a thickening procedure.

Moreover, it is no longer by a compressed fluid inside a mould but by an expansible mandrel that the radial expansion is produced. The expansible mandrel is constituted, in the known manner, by articulated jaws 37 which give the inside shape of the socket. The jaws 37 are separated by means of an expanding cone 38 actuated by a support rod 39 which is driven by a jack (not shown). The end of the tube $T^3$ is thus expanded inside a vessel 40 of water under pressure or, by way of a modification (not shown), inside a mould of appropriate shape.

Other modifications reside in moving the drawing machine B or $B^1$ in both directions by means of a rack-and-pinion system or a hydraulic jack.

Also by way of a modification, it is the extruder which is mounted on the carriage and the drawing machine is fixed to the ground. To produce the sleeves 35, the extruder 23 moves toward the drawing machine at high speed. To produce the body portion of the tube, the extruder moves away from the drawing machine at low speed.

It is clear that the process and installation of the invention are applicable to the production of all types of periodic internal or external projections in an extruded solid or hollow product intended in particular to undergo local expansions in the thickened regions. In particular, for external projections, effected on a hollow product, the cold die head 4 would obviously be replaced by a mandrel for effecting an internal calibration.

Figure 12:
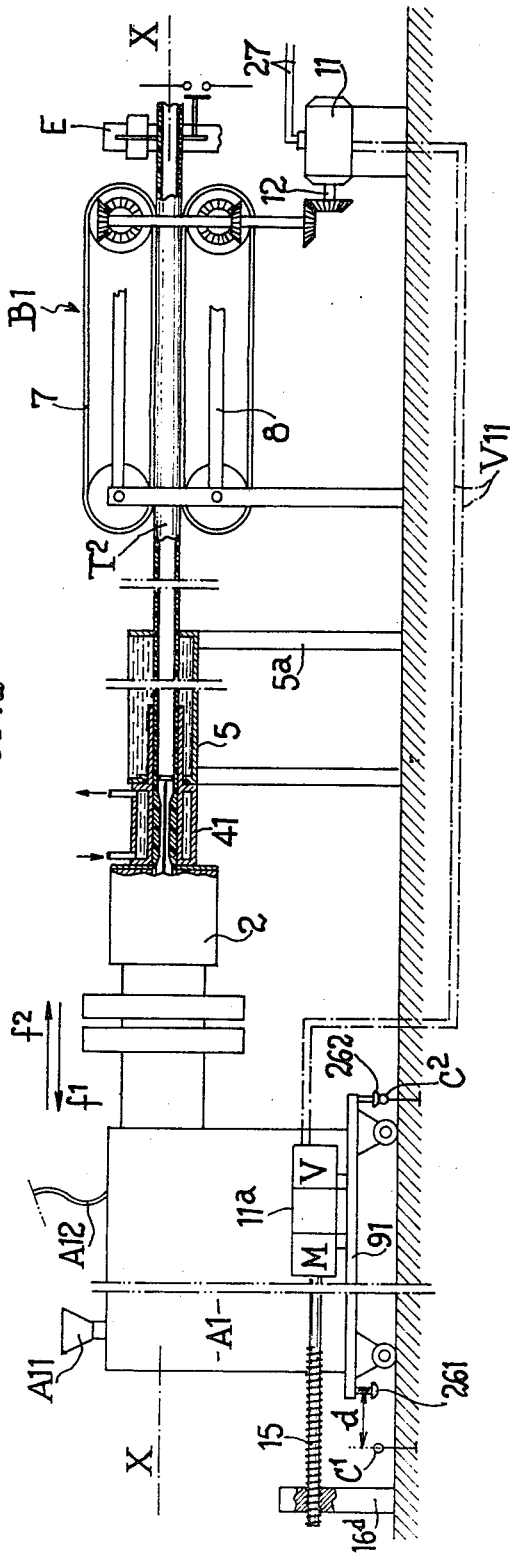
FIG. 12 is a diagrammatic assembly view, similar to FIG. 1, of another embodiment of an installation according to the invention.
Figure 13:
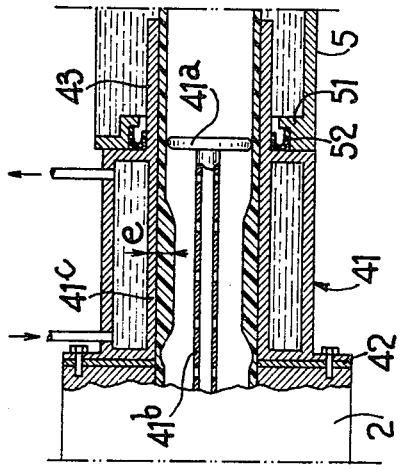
FIG. 13 is a sectional view to an enlarged scale of a detail of the installation of FIG. 12.

In FIGS. 12 and 13, identical means and devices have been designated by the same reference numerals as in the preceding Figures. Similar means but which have a few differences as concerns their design or their operation have been designated by numbers of which the tens are the same as the units of the numbers of the first embodiment.

The installation shown in FIG. 12 comprises, as that shown in FIG. 1, in the direction toward the downstream end, an extruder $A^1$, a hot die head 2 of the extruder, a cold calibrating die head 41, a cooling tank 5 containing water, a drawing machine $B^1$ having tracks 7 driven in translation in the direction of axis X—X, a continuously extruded tube $T^2$, and a sectioning or severing device E.

As opposed to FIG. 1, the extruder $A^1$ is mounted on a carriage 91 which moves along a runway and the drawing machine $B^1$ is secured to the ground by the frame 81 therefor. The motor 11 for driving the tracks 7 at constant speed is also fixed to the ground.

The carriage 91 supporting the extruder $A^1$ also carries a motor $11^a$ having an electronic speed variator V of any suitable type, which drives in rotation a leadscrew 15 cooperating with a fixed nut 16, through a reversing mechanism M which has two different drive ratios depending on the direction and is for example a conventional mechanism having gear trains. Owing to the effect of the lead-screw and nut, the rotation of the lead-screw 15 moves the carriage 91 and therefore the extruder $A^1$ in translation.

The moving extruder $A^1$ is supplied with thermoplastic material to be gelled and extruded by a hopper $A^{11}$ and a flexible sleeve (not shown) which pours the material into the hopper $A^{11}$. The screw (not shown) of the extruder $A^1$ is driven in rotation by a constant-speed motor (not shown) supplied with current by a flexible line $A^{12}$ connected to the electric mains.

As in FIG. 1, the carriage 91 is provided at the ends thereof with projections or ramps $26^1$ and $26^2$ which cooperate with end-of-travel limiters or contacts $C^1$ and $C^2$ which are fixed relative to ground.

The speed of rotation of the electronic speed variator V is controlled by the theoretically constant drive speed of the tracks 7 of the drawing machine $B^1$ by a control line VII shown in double dot-dash line and connecting the variator V to the motor 11.

The cold calibrating die head 41 has been shown in the case where the calibration is carried out under internal pressure, that is to say, within the extruded tube of thermoplastic material. This calibration is effected by a flexible closure member $41^a$ secured to the end of a hollow perforated tube $41^b$ through which compressed air is blown. For this reason, the cold die head 41 is fixed by a flange 42 to the hot die head 2 without interruption between the outlet of the hot die head and the inlet of the cold die head. Indeed, there must be no empty space between the die heads 2 and 41 since otherwise, owing to the internal inflation adapted to apply the extruded tube against the inner wall of the calibrator, a bead would be produced by this space between the hot die head 2 and the cold die head 41. By securing the hot die head 2 to the cold die head 41 without a space therebetween, this outer bead is avoided.

The cooling tank 5 is carried by a fixed frame $5^a$ and the cold die head 41 is mounted in a telescopic manner relative to the tank 5. For this purpose, the calibrating sleeve proper $41^c$ is extended at 43 inside the cooling tank 5 and assembled with the latter in a telescopic and sealed manner owing to an inlet cavity 51 of the tank 5 and provision of an annular sealing member of the type having a C-type section with elastic lips 52 interposed, with a slight radial compression, between the extension 43 of the sleeve $41^c$ and the cavity 51.

Note that if the calibration is carried out under a vacuum, there is no danger of a creation of a bead between the two die heads and means are provided for regulating the distance between these heads, this distance being, for example, visible in FIG. 1. In this case, regulating means may be provided for regulating the position of the tank 5 along the axis X—X, it being understood that, after this initial regulation, the cooling tank 5 remains fixed, so as to lighten the moving part.

The installation operates in a similar manner to the first embodiment, except that while driving the tracks 7 at constant speed, the extruder $A^1$ is moved toward the drawing machine $B^1$ by driving the carriage 91 at a high speed in the direction of arrow $f^2$ so as to form an internal thickening e inside the cold calibrating die head 41, then the direction of rotation of the lead-screw 15 is reversed rapidly or practically instantaneously so as to cause the extruder $A^1$ to travel rearwardly and slowly at a constant speed in the direction of arrow $f^1$. During the first displacement, the extension 43 of the calibrating sleeve moves inwardly of the cooling tank in the direction of arrow $f^2$ until it reaches the position shown in FIG. 13 in which the die head 41 is almost in contact with the tank 5 then, during the second displacement, the extension 43 moves out of the tank while permanently maintaining a sealed contact with the annular sealing member 52 by sliding inside the latter. Of course, the length of the extension 43 is at least equal to the travel d of the carriage 91.

As the speed of displacement in translation of the extruder $A^1$ and the speed at which the tracks of the drawing machine $B^1$ are driven by the motor 11, are a function of the desired speed of drawing for the plastics tube, and in a constant ratio, if the speed of the motor 11 is modified, or if it varies accidentally, the other must be modified in order to maintain the same thickening rate or the same ratio between the periodic thickening e and the normal thickness of the extruded tube. Also, the reversing time must be maintained nil or minimum for the displacement of the carriage 91 irrespective of the variations in the speed of the extruding machine $A^1$ in the direction of arrows $f^1$ and $f^2$. This is the reason for the provision of the servo-control line VII between the speed variator V and the motor 11 driving the tracks 7.

Further, the variator V permits the synchronized driving of the carriage 91 notwithstanding the fact that the latter is remote from the motor 11 and therefore difficult to reach with a direct connection with the latter.

During operation, the contacts $C^1$–$C^2$ and the contacts $26^1$–$26^2$ cause, at each end-of-travel, the instantaneous reversal of the mechanism M. Moreover, by way of a modification, the latter may be of the type of the double transmission $91^a$–$91^b$ described in the first embodiment.

Having now described our invention what we claim as new and desire to secure by Letters Patent is:

1. An installation for extruding a body, and in particular a tube of thermoplastic material having a variable thickness, comprising a: constant-output extruder, a cold calibrating die head adjacent the extruder for sizing the exterior of the extruded body issuing from the extruder, a cooling tank adjoining the cold die head for cooling the extruded body issuing from the cold calibrating die head, and a drawing machine which is located downstream of the cooling tank relative to the flow of thermoplastic material, said drawing machine comprising a plurality of rolling means rotatable about axes for rolling by friction on the extruded body and arranged around a section of the body, a frame movable in a to-and-fro manner in a direction perpendicular to said axes of rotation of the rolling means, the extruder and the drawing machine constituting two elements one of which elements is carried by the frame, means operatively associated with the rolling means for driving the rolling means at a constant speed, and means operatively associated with the frame for driving the frame in said direction.

2. An installation as claimed in claim 1, wherein the frame driving means comprises a mechanism, a single motor is provided for the two driving means, a first transmission connects the motor to the rolling means, and a second transmission connects the motor to said mechanism.

3. An installation as claimed in claim 2, wherein the mechanism for moving the frame comprises a lead-screw at the end of the second transmission and a nut fixed relative to the ground and cooperative with the lead-screw.

4. An installation as claimed in claim 2, wherein the mechanism for moving the frame comprises a gear pinion at the end of the second transmission and a rack fixed relative to the ground and cooperative with the gear pinion.

5. An installation as claimed in claim 1, wherein said means for driving the frame comprise a hydraulic jack.

6. An installation as claimed in claim 1, wherein the means for driving the frame comprise a reversing mechanism having different transmission ratios in the two directions.

7. An installation as claimed in claim 6, comprising end-of-travel contacts fixed relative to the ground and ramps carried by the frame for actuating the reversing mechanism.

8. An installation as claimed in claim 1, wherein the drawing machine is fixed in translation and the extruder is carried by the movable frame.

9. An installation as claimed in claim 8, wherein the means for driving the frame comprise a motor provided with a speed variator controlled by the speed of rotation of the means for driving the rolling means.

10. An installation as claimed in claim 9, wherein the speed variator is an electronic speed variator.

11. An installation for extruding a body, and in particular a tube of thermoplastic material having a variable thickness, comprising: a constant-output extruder, a cold calibrating die head adjacent the extruder for sizing the exterior of the extruded body issuing from the extruder, a cooling tank adjoining the cold die head for cooling the extruded body issuing from the cold calibrating die head, and a drawing machine which is located downstream of the cooling tank relative to the flow of thermoplastic material, said drawing machine comprising a plurality of rolling means rotatable about axes for rolling by friction on the extruded body and arranged around a section of the body, a frame movable in a to-and-fro manner in a direction perpendicular to said axes of rotation of the rolling means, the extruder and the drawing machine constituting two elements one of which elements is carried by the frame, means operatively associated with the rolling means for driving the rolling means at a constant speed, and means operatively associated with the frame for driving the frame in said direction, the means for driving the frame driving the frame at a first speed in one direction corresponding to a relative movement of the extruder and drawing machine toward each other and at a lower second speed in the opposite direction.

12. An installation for extruding a body, and in particular a tube of thermoplastic material having a variable thickness, comprising: a constant-output extruder and a drawing machine which is located downstream relative to the flow of thermoplastic material, said drawing machine comprising a plurality of rolling means rotatable about axes for rolling by friction on the extruded body and arranged around a section of the body, a frame movable in a to-and-fro manner in a direction perpendicular to said axes of rotation of the rolling means, the extruder being carried by said frame and the drawing machine being fixed in translation, the extruder comprising a hot die head and a calibrating cold die head having an outlet, a cooling tank provided at the outlet of the cold die head, the cooling tank being fixed and the cold die head being fixed relative to the hot die head and including an extension and means defining an inlet orifice in the tank in which orifice the extension is telescopically slidable with interposition of a seal.

* * * * *